UNITED STATES PATENT OFFICE.

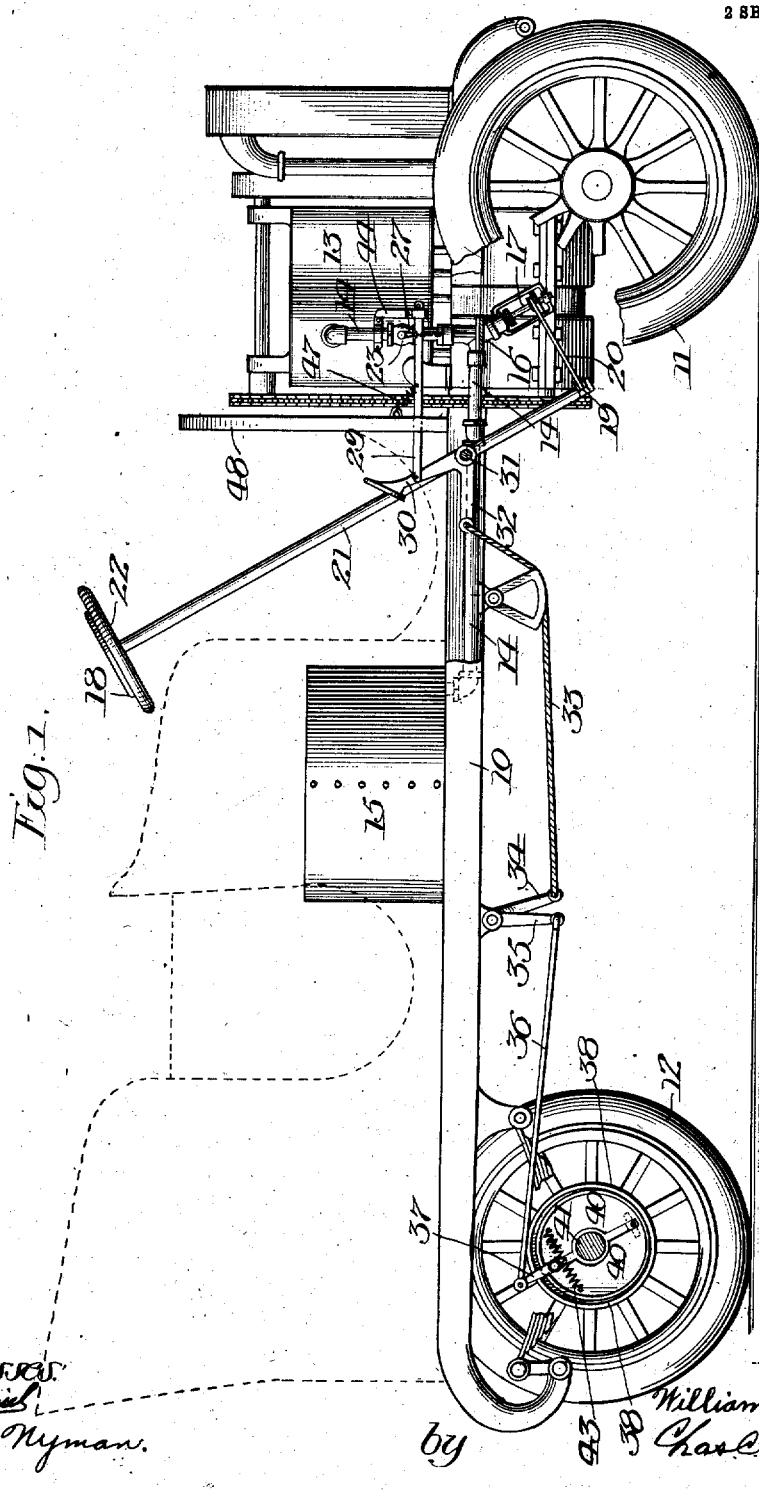

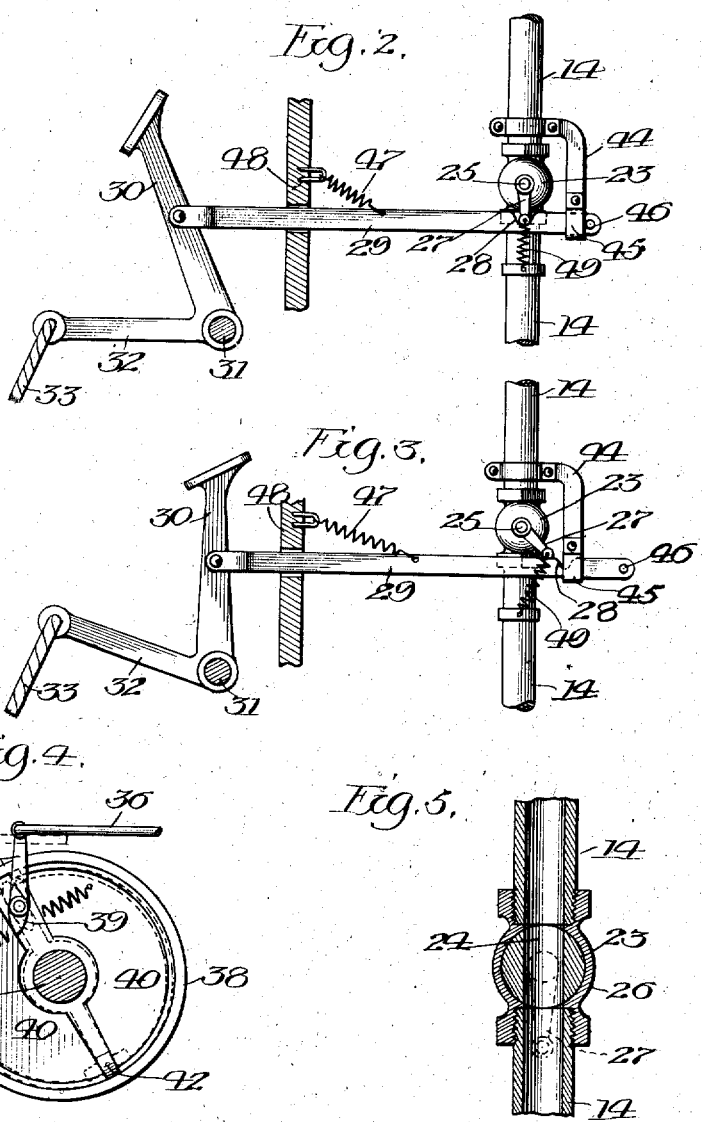

WILLIAM C. VAN BUREN, OF CHICAGO, ILLINOIS.

CONTROLLING DEVICE FOR MOTOR-VEHICLES.

No. 905,607.

Specification of Letters Patent.

Patented Dec. 1, 1908.

Application filed March 2, 1908. Serial No. 418,665.

*To all whom it may concern:*

Be it known that I, WILLIAM C. VAN BUREN, a citizen of the United States, residing at Chicago, in the county of Cook and State of Illinois, have invented certain new and useful Improvements in Controlling Devices for Motor-Vehicles, of which the following is a specification.

This invention relates to improvements in means to be employed with certain parts of automobiles whereby the motive fluid, such as steam, may be shut off from the engine-cylinder and the brake for stopping the movement of the automobile applied to one of the wheels thereof by one impulse or one movement of the operator, and in such a manner that the shutting off of the motive fluid will be accomplished immediately before the application of the brake is made to the wheel, and so that the operation of shutting off the motive fluid will in no way interfere with the operation of applying the brake with whatever degree of pressure or force desired, and while the invention is more particularly designed for and intended to be used on automobiles of the "White steam car" type, yet it is applicable for use on automobiles of other types, and for this reason I desire it to be understood that I do not wish to be limited in the use of my invention to any specific form of automobile, but may apply it wherever practicable; and it consists in certain peculiarities of the construction, novel arrangement, and operation of the parts thereof, as will be hereinafter more fully set forth and specifically claimed.

In order to enable others skilled in the art to which my invention pertains, to make and use the same, I will now proceed to describe it, referring to the accompanying drawings, which serve to illustrate my invention, and in which—

Figure 1 is a side view partly in section and partly in elevation of an automobile of the "White steam car" type, and in which is shown a sufficient portion of the mechanism thereof to illustrate the application and operation of my invention applied thereto; Fig. 2 is a view in side elevation of a portion of the steam pipe leading from the generator to the engine-cylinder, showing it equipped with my improvement, and the parts in the positions they will occupy when motive fluid is supplied to the engine-cylinder; Fig. 3 is a like view of similar parts, showing the positions they will occupy when the motive fluid has been shut off and in the act of setting the brake; Fig. 4 is an inner face view of one of the brake-drums of the rear wheels of the automobile, showing by full lines the positions the brake-shoes will occupy when set and after the motive fluid has been shut off, and by dotted lines the normal positions of the brake-shoes and the operating parts therefor;—and—Fig. 5 is a longitudinal sectional view of a portion of the steam pipe leading to the engine-cylinder, showing a valve in open position for controlling the flow of fluid through said pipe.

Like numerals of reference, refer to corresponding parts throughout the different views of the drawings.

The reference numeral 10 designates the chassis or frame of the automobile, which may be of the ordinary or any preferred construction, and mounted in any well known manner on the front and rear wheels 11 and 12, respectively, of the machine. On the front portion of the chassis is mounted an engine 13 which has communication through a steam pipe 14 with a generator 15, which is preferably mounted about midway of the chassis. As is clearly shown in Fig. 1 of the drawings, the steam supply pipe 14 is extended outwardly from the engine-cylinder 13 and then downwardly and then horizontally and rearwardly to the generator with which it is connected. At about the juncture of the vertical portion of the supply pipe 14 with its horizontal portion is connected so as to communicate therewith a throttle 16, of any ordinary or well known type, the stem 17 and valve (not shown) of which may be operated in the usual manner by means of a throttle-wheel 18, rod 19, and a connection 20 uniting the lower end of said rod and the throttle-stem 17, as will be understood by reference to Fig. 1 of the drawings. The rod 19, on the upper end of which is secured the throttle-wheel 18, is extended through a tubular steering-rod 21 which is suitably journaled on the chassis, and has at its upper end a steering-wheel 22 to be used for turning said rod and guiding the machine.

Located in the steam supply pipe 14 near the engine-cylinder 13, and preferably in the upwardly extending portion of said pipe, is a valve 23, the port 24 of which is adapted, when motive fluid is being supplied to the engine, to register with the openings of the pipe sections 14, as is clearly shown in Fig. 5 of the drawings. This valve may be of the ordinary or any preferred construction, but in the present instance is shown of the rotary type, and has a valve-stem 25 journaled in the casing 26, and provided on one of its ends with a crank 27, the lower portion of which is adapted to engage a recess 28 formed in a reciprocating rod or bar 29 near its front end, the other end of which is pivotally connected to a lever, which in the present instance is shown as being of the bell-crank-lever type, the longer arm 30 of which, to which the rod or bar 29 is pivotally connected, forming a pedal for the foot-brake. This lever is suitably fulcrumed as at 31 on the chassis, and has its shorter arm 32 connected by means of a cable 33, or otherwise, to one arm 34 of a bell-crank-lever, which is fulcrumed on the chassis or frame 10, to the other arm 35 of which is connected by means of a rod 36 a lever 37 fulcrumed on the brake-drum 38 of one of the rear wheels of the automobile. The lever 37 carries on its lower portion a cam 39 which is located between the upper portions of the brake-shoes 40, which are of the well known construction, and surround the rear axle 41 so that when they are separated at their upper portions by means of the lever 37 and its cam 39 their peripheries will be forced into contact with the inner periphery of the brake-drum. The adjacent lower portions of the brake-shoes 40 may be connected together in any suitable manner, but preferably by means of a turn-buckle 42, as shown in Fig. 4 of the drawings. The upper portions of the brake-shoes 40 are normally held in their retracted positions by means of a spring 43 secured at its ends to each of said shoes.

Mounted on the steam supply pipe 14 and usually above the valve 23 thereon is a bracket 44 which is provided with a bearing 45 for the front portion of the reciprocating rod or bar 29, which may have in its front or free end a pin or projection 46 to restrict its rearward movement. Secured at one of its ends to the rod or bar 29 is a spring 47, the other end of which is secured to a suitable support 48, such as the dashboard of the automobile, and said spring is used to assist in retracting the bar or rod 29 and thereby opening the valve 23 to permit of the supply of motive fluid to the engine. The lower end of the crank 27 on the valve-stem 25 has secured thereto one end of a spring 49, the other end of which may be secured to the pipe 14, or otherwise.

From the foregoing and by reference to the drawings it will be readily understood and clearly seen that, when the parts are in the positions shown in Figs. 1, 2 and 5 of the drawings, the valve 23 will be open so as to permit of the passage of motive fluid from the generator to the engine-cylinder and to drive the machine, and when it is desired to shut off the motive fluid and apply the brake all that is necessary is to move the lever 30 from the position shown in Fig. 2 forwardly or to the position shown in Fig. 3, in which operation it is evident that the valve 23 will be closed in the initial movement of said lever and the connection 29 between it and the valve, when by further movement of the lever the lower portion of the crank 27 on the valve-stem will be thrown out of engagement with the recess 28 in the rod or bar 29, thus permitting further forward movement of the lever 30 so as to apply, through its connections 33, 36, 37 and 39, the brake-shoes 40 against the brake-drum 38 with the desired degree of pressure. When the pressure or force has been removed from the lever 30, it is apparent that the spring 47 will retract the rod or bar 29, in which operation the lower portion of the crank 27 will again engage the recess 28 therefor in the bar or rod 29, and as said bar is moved further rearwardly the valve 23 will again be opened. It is apparent that the spring 49 will yieldingly hold the lower portion of the valve-stem against the rod or bar 29 so that its engagement with the recess 28 therein will be positive. It is further manifest that in the initial forward movement of the lever 30 so as to move the lever 37 (see Fig. 4) from its position shown in dotted lines to about that shown by continuous lines, the motive fluid through the pipe 14 will be entirely shut off at about the time the application of the brake is begun to be applied. In other words, in the forward movement of the lever 30 the valve 23 will first be closed and then the brake applied by one movement or impulse of the operator.

Having thus fully described my invention, what I claim as new, and desire to secure by Letters-Patent, is—

The combination with an automobile, of an engine and brake therefor, a motive fluid supply pipe communicating with the engine, a throttle communicating with the supply pipe at a distance from the engine, means to operate the throttle, a shut-off-valve located in said pipe between the engine and throttle and having a crank on its stem, a lever suitably fulcrumed near said valve, a rod or bar movably supported near one of its ends and pivotally secured at its other end to the lever and having a recess to engage the crank on the valve-stem, a spring to retract the rod or bar, and a connection operatively uniting the lever and brake.

WILLIAM C. VAN BUREN.

Witnesses:
CHAS. C. TILLMAN,
M. A. NYMAN.